(12) United States Patent
Ding

(10) Patent No.: US 8,339,779 B2
(45) Date of Patent: Dec. 25, 2012

(54) ELECTRONIC DEVICE PROVIDING CARD HOLDER ACCESS

(75) Inventor: You-Xiang Ding, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 292 days.

(21) Appl. No.: 12/912,773

(22) Filed: Oct. 27, 2010

(65) Prior Publication Data
US 2012/0087068 A1    Apr. 12, 2012

(30) Foreign Application Priority Data
Oct. 8, 2010   (CN) .......................... 2010 1 0500017

(51) Int. Cl.
*G06F 1/16* (2006.01)
(52) U.S. Cl. ................ 361/679.33; 235/492; 340/686.6; 439/630; 248/442.2
(58) Field of Classification Search .................. 235/477, 235/492, 486, 439, 470, 379; 361/726, 752, 361/757, 756, 737, 801, 802, 807, 818, 679.01, 361/679.31, 679.32, 679.37; 340/686.6, 340/5.65, 5.5; 439/327, 630, 370, 326, 59, 439/541.5; 312/223.1, 186, 244; 248/449, 248/458, 213.2, 442.2
See application file for complete search history.

(56) References Cited

U.S. PATENT DOCUMENTS
2012/0020034 A1* 1/2012 Zhang ........................... 361/752
2012/0024958 A1* 2/2012 Wang et al. ................... 235/477

* cited by examiner

*Primary Examiner* — Hung Duong
(74) *Attorney, Agent, or Firm* — Altis Law Group, Inc.

(57) ABSTRACT

An electronic device includes a main body, a card holder assembly, and a card holder control assembly. The card holder assembly includes a shaft secured within the main body, at least one torsion spring, and at least one card holder. The torsion spring is arranged over the shaft. One end of each torsion spring is secured to the shaft, and an opposite end is secured to one card holder. When the card holder is secured within the main body, the torsion spring is in a compressed state. The card holder is rotatably fixed in place on the shaft. The control assembly includes a switch, a pulling rod, and at least one latching member. The switch is slidably connected to the main body and moveable between a first position and a second position. The latching member is connected to the pulling rod.

10 Claims, 4 Drawing Sheets

ELECTRONIC DEVICE PROVIDING CARD HOLDER ACCESS

BACKGROUND

1. Technical Field

The present disclosure relates to electronic devices and, particularly, to an electronic device providing card holder access of the electronic device.

2. Description of Related Art

To access a mobile phone smart card, a cover and a battery must often first be removed, or at least a cover must be removed.

Therefore, what is needed is an electronic device which provides better access to the smart card.

BRIEF DESCRIPTION OF THE DRAWINGS

The components of the drawings are not necessarily drawn to scale, the emphasis instead being placed upon clearly illustrating the principles of an electronic device providing card holder access. Moreover, in the drawings, like reference numerals designate corresponding parts throughout several views.

DETAILED DESCRIPTION

Figure 1:
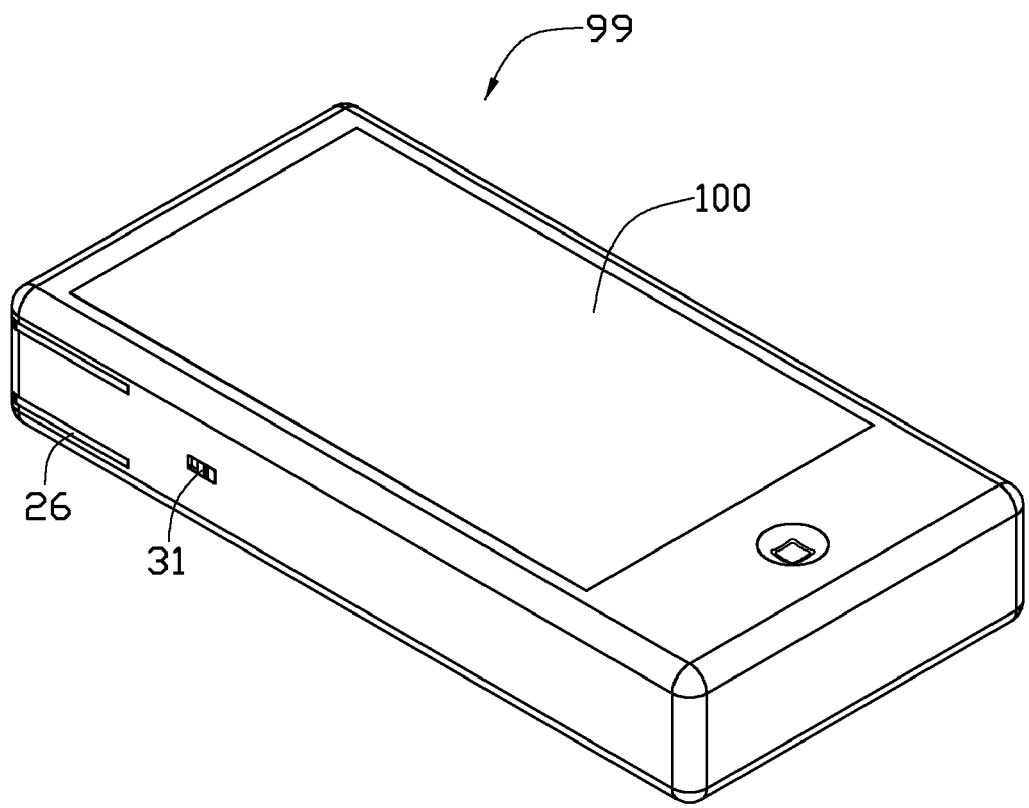
FIG. 1 is an isometric view of an electronic device in accordance with an exemplary embodiment.
Figure 2:
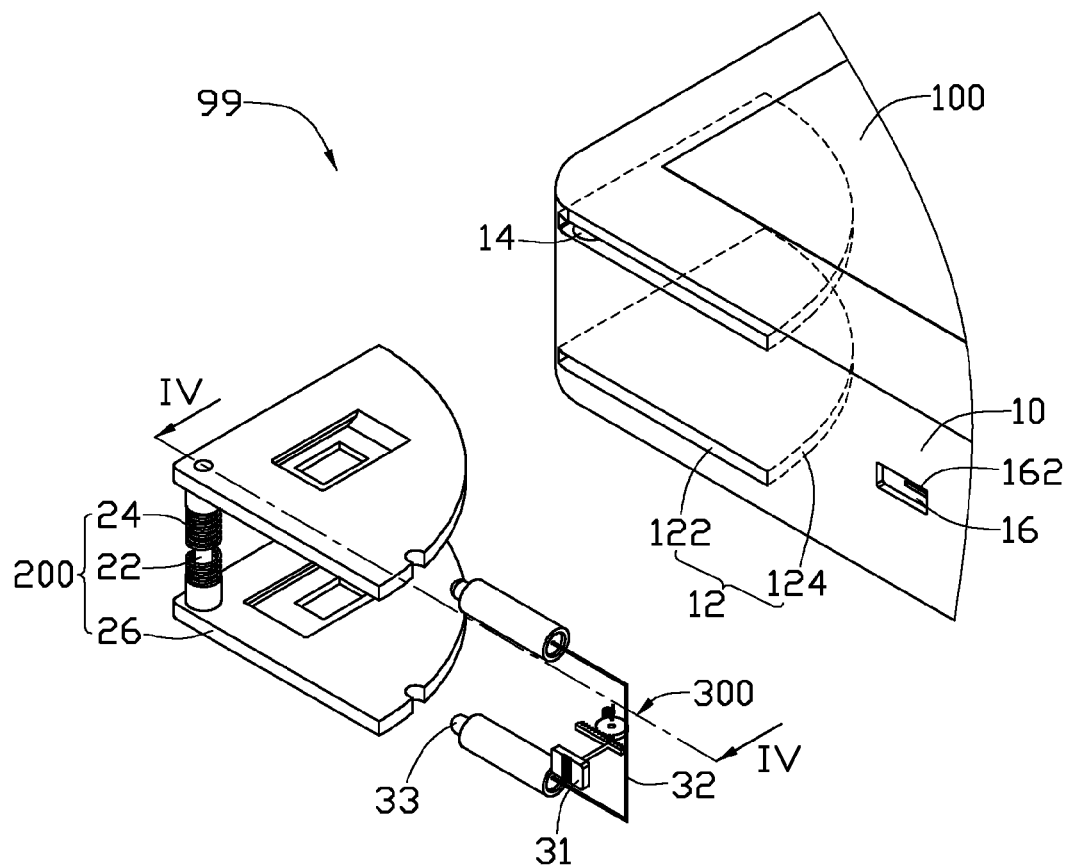
FIG. 2 is a partial, exploded, perspective view of the electronic device of FIG. 1, showing a card holder assembly and a card holder control assembly of the electronic device.

Referring to FIGS. 1-2, an electronic device 99 includes a main body 100, a card holder assembly 200, and a card holder control assembly 300. The card holder assembly 200 includes a shaft 22, at least one torsion spring 24, and at least one card holder 26 for at least one electronic card, such as a smart card, a memory card, or other. The shaft 22 is secured within the main body 100. The at least one torsion spring 24 is arranged over the shaft 22. One end of each torsion spring 24 is attached to the shaft 22, and an opposite end is attached to one card holder 26. The at least one card holder 26 is rotatably fixed in place on the shaft 22. When the at least one card holder 26 is secured within the main body 100, the at least one torsion spring 24 is in a compressed state. The card holder control assembly 300 includes a switch 31, a pulling rod 32, and at least one latching member 33. The switch 31 is slidably connected to the main body 100 and can be moved between a first position and a second position. The at least one latching member 33 is connected to the pulling rod 32. When the switch 31 is in the first position, the at least one latching member 33 can latch the at least one card holder 26 to the main body 100. When the switch 31 is moved to the second position, the switch 31 drives the pulling rod 32 away from the at least one card holder 26, moving the at least one latching member 33 away from the at least one card holder 26 until the at least one latching member 33 withdraws from the at least one card holder 26. At this point, the at least one torsion spring 24 returns to its original state to drive the at least one card holder 26 out of the main body 100. When the switch 31 returns to the first position, the pulling rod 32 and the at least one latching member 33 return to their original state.

In this embodiment, two card holders 26, two torsion springs 24, and two latching members 33 are deployed. The card holders 26 are respectively rotatably fixed on opposite ends of the shaft 22. Each latching member 33 can latch one card holder 26 to the main body 100. Two opposite ends of one torsion spring 24 are respectively attached to the shaft 22 and one card holder 26, and two opposite ends of the other torsion spring 24 are respectively attached to the shaft 22 and the other card holder 26. When the card holders 26 are secured within the main body 100, the torsion springs 24 are in a compressed state, so the torsion springs 24 can drive the card holders 26 out of the main body 100 when the latching members 33 disengage from the card holders 26. In an alternative embodiment, a torsion spring with three ends may replace the torsion springs 24. The three ends are respectively attached to the shaft 22 and the card holders 26. In this embodiment, the electronic device 99 may be a portable electronic device, for example, a mobile phone.

The main body 100 defines two compartments 12 and a through hole 14 extending along a wide side of the main body 100 and communicating with the compartments 12. The shaft 22 is secured within the through hole 14. In this embodiment, the compartments 12 are parallel to each other, and each configured to receive one card holder 26. Each compartment 12 includes a first opening 122 defined in a sidewall 10 of the main body 100 and a second opening 124 communicating with the first opening 122. The first openings 122 extend along a longitudinal side of the sidewall 10. The latching members 33 latch the card holders 26 to the main body 100 through the second openings 124, and the card holders 26 move out of the compartments 12 through the first openings 122. In this embodiment, the compartments 12 are substantially sector-shaped, and the second openings 124 are substantially sector-shaped. The sidewall 10 further defines a switch bay 16 to receive the switch 31. The bottom of the switch bay 16 defines a sliding slot 162 extending along the longitudinal side of the sidewall 10. The switch 31 is moved between the first position and the second position in the switch bay 16. In this embodiment, the switch bay 16 is arranged between the compartments 12.

Figure 3:
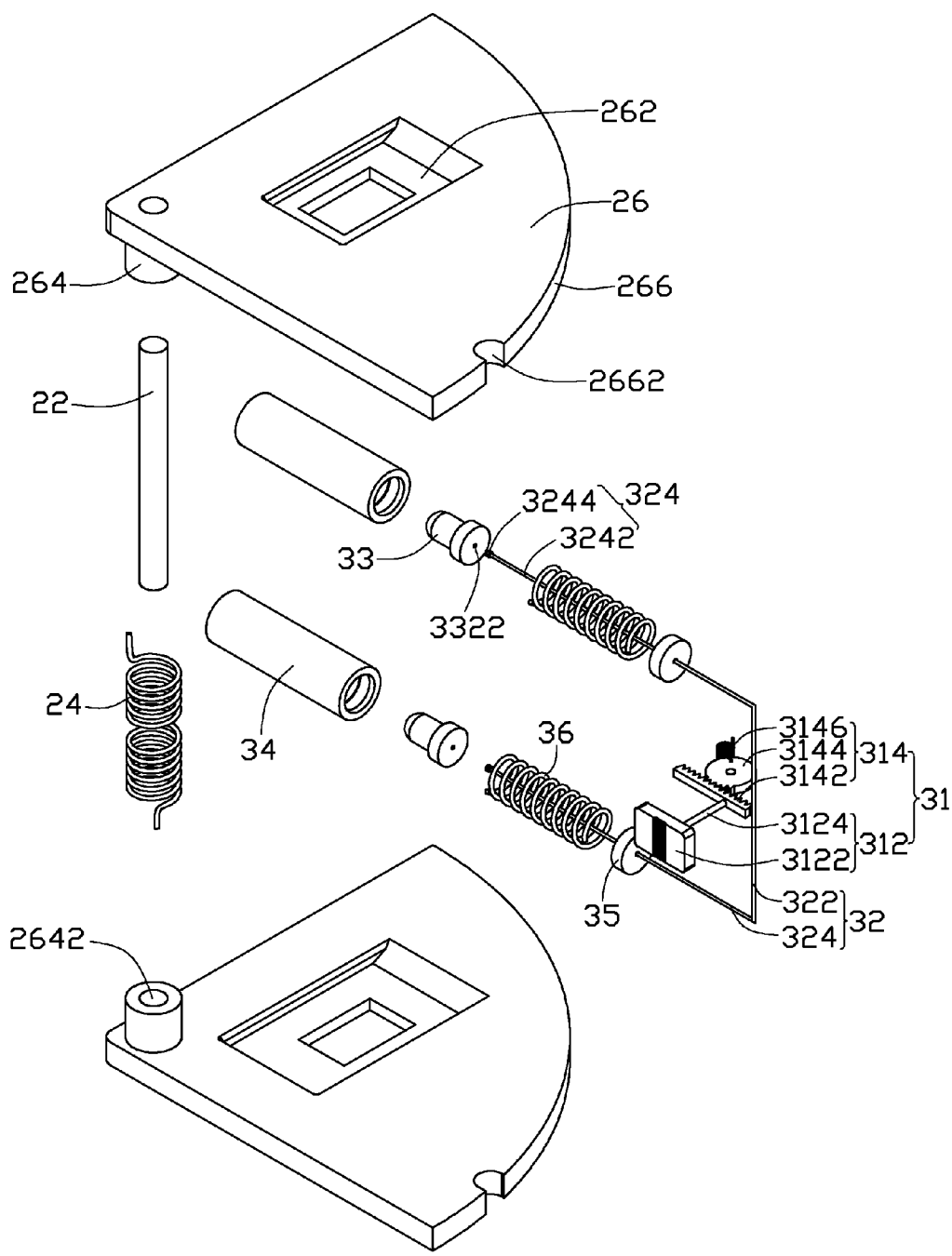
FIG. 3 is a further exploded, perspective view of the card holder assembly and the card holder control assembly of FIG. 2.

Referring to FIG. 3, each card holder 26 defines a receiving space 262 to receive the electronic card. Each card holder 26 includes a protruding post 264 defining a longitudinal shaft hole 2642. The diameter of the shaft hole 2642 is substantially equal to that of the shaft 22. The opposite ends of the shaft 22 are respectively received in the shaft holes 2642. A sidewall 266 of each card holder 26 defines a recessed portion 2662. The latching members 33 respectively engage the recessed portions 2622 to secure the card holders 26 within the compartment 12. In this embodiment, the card holders 26 are substantially sector-shaped, and the sidewalls 266 are substantially sector-shaped. The protruding posts 264 are substantially on the center of the card holders 26.

The switch 31 includes an operable member 312 and a transmission mechanism 314. The operable member 312 includes a slidable plate 3122 and a connecting rod 3124 with an end substantially perpendicular to and secured to the slidable plate 3122. The slidable plate 3122 is slidably received in the switch bay 16 for operation. The connecting rod 3124 extends through the sliding slot 162. The switch 31 is moved between the first position and the second position when the operable member 312 is impelled along the longitudinal side of the main body 100. The transmission mechanism 314 is configured to drive the switch 31 from the second position to the first position. The transmission mechanism 314 includes a rack 3142, a gear 3144, and a torsion spring 3146. The rack 3142 is substantially perpendicular to and secured to an opposite end of the connecting rod 3124 and engages the gear 3144. One end of the torsion spring 3146 is secured to the main body 100, and an opposite end is secured to the gear 3144.

The pulling rod 32 includes a first rod 322 and two second rods 324 substantially perpendicular to and secured to the first rod 322 and arranged at the same side of the first rod 322. The switch 31 is arranged between the second rods 324. When the switch 31 is moved from the first position to the second position, the rack 3142 pushes the first rod 322 away from the card holders 26. Each second rod 324 includes a rod portion 3242 and an end portion 3244. The size of the rod portion 3242 is less than that of the end portion 3244.

Figure 4:
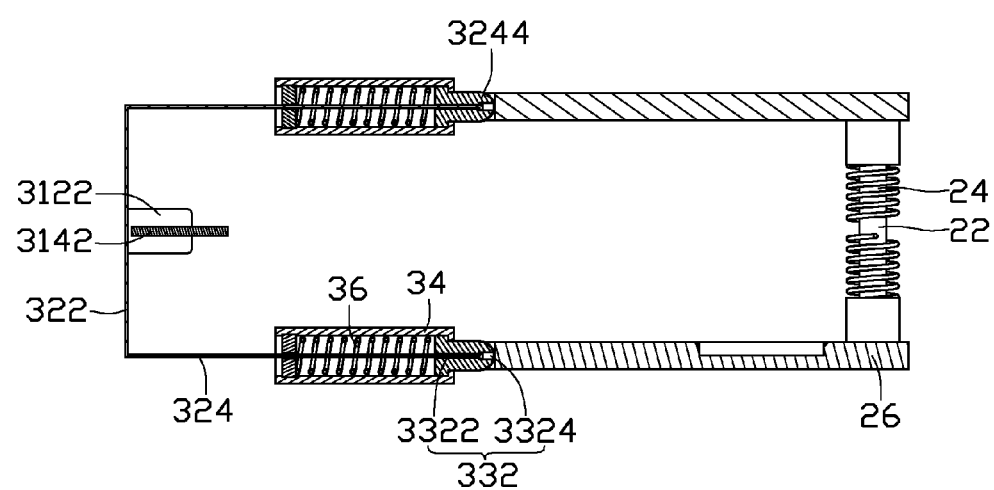
FIG. 4 is a cross-section of the card holder assembly and the card holder control assembly of FIG. 2, taken along line IV-IV.

Referring to FIG. 4, each latching member 33 defines a longitudinal stepped hole 332. The stepped hole 332 includes a small hole 3322 and a large hole 3324. The diameter of the small hole 3322 is substantially equal to or exceeds that of the rod portion 3242. The diameter of the large hole 3324 is substantially equal to or exceeds that of the end portion 3244. The rod portion 3242 is partially received in the small hole 3322. The end portion 3244 is received in the large hole 3324 and resists the sidewalls of the large hole 3324.

The card holder control mechanism 300 further includes a sleeve 34, a stopper block 35 secured within the sleeve 34, and an elastic member 36 in the sleeve 34. In this embodiment, the elastic member 36 is a coil spring. The stopper block 35 and the elastic member 36 are arranged over the second rod 324. One end of the elastic member 36 resists the stopper block 35, and an opposite end resists the latching member 33.

When the switch 31 is in the first position, the torsion spring 3146 and the elastic member 36 are in a relaxed state, and the latching members 33 are respectively received in the recessed portions 2662 to latch the card holders 26 to the compartments 12. To eject the card holders 26, the slidable plate 3122 is impelled from the first position to the second position. While pushing the slidable plate 3122, the connecting rod 3124 moves in the sliding slot 162 to drive the rack 3142 away from the card holders 26, pushing the first rod 322 away from the card holders 26. The movement of the rack 3142 rotates the gear 3142, causing the torsion spring 3146 to be in a compressed state. The movement of the first rod 322 drives the second rods 324 and the latching members 33 away from the card holders 26, compressing the elastic members 36. As the latching members 33 move out of the recessed portions 2662, the torsion springs 24 return to their original state to drive the card holders 26 out of the compartments 12. At this point, cards can be placed into the card holders 26 or replaced. As the slidable plate 3122 is released, the torsion spring 3146 returns to its original state to rotate the gear 3144 in an opposite direction, driving the rack 3142 in an opposite direction and returning the switch 31 to the first position. Simultaneously, the elastic members 36 rebound to return the pulling rod 32 and the latching members 33 to their original state. To secure the card holders 26, the card holders 26 are impelled into the compartments 12. While the latching members 33 are received in the recessed portions 2662, the card holders 26 are secured to the main body 100.

In an alternative embodiment, the transmission mechanism 314 is absent from the switch 31. Rather, the connecting rod 3124 is substantially perpendicular to and secured to the first rod 322. Thus, when the switch 31 is moved from the first position to the second position, the switch 31 brings the pulling rod 32 and the latching members 33 away from the card holders 26. When the switch 31 is released, the elastic members 36 rebound to return the switch 31 to the first position.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
   a main body;
   a card holder assembly comprising a shaft, at least one first torsion spring, and at least one card holder, wherein, the shaft is secured within the main body, the at least one first torsion spring is arranged over the shaft, one end of each of the at least one first torsion spring is secured to the shaft, and an opposite end of each of the at least one first torsion spring is secured to one of the at least one card holder, when the at least one card holder is secured within the main body, the at least one first torsion spring is in a compressed state, the at least one card holder is rotatably fixed in place on the shaft; and
   a card holder control assembly comprising a switch, a pulling rod, and at least one latching member, wherein, the switch is slidably connected to the main body and is moveable between a first position and a second position, the at least one latching member is connected to the pulling rod;
   wherein, when the switch is in the first position, the at least one latching member is able to latch the at least one card holder to the main body, when the switch is moved to the second position, the switch drives the pulling rod away from the at least one card holder, causing the at least one latching member to move away from the at least one card holder so that the at least one latching member disengages from the at least one card holder, when the at least one latching member disengages from the at least card holder, the at least one first torsion spring returns to its original state to drive the at least one card holder out of the main body, when the switch returns to the first position, the pulling rod and the at least one latching member return to their original state.

2. The electronic device as described in claim 1, wherein the switch comprises an operable member and a transmission mechanism connected to the operable member, the operable member is partially exposed from the main body for operation, the transmission mechanism is configured to drive the switch to move from the second position to the first position.

3. The electronic device as described in claim 2, wherein the transmission mechanism comprises a rack, a gear, and a second torsion spring, the rack is secured to the operable member and engages the gear, one end of the second torsion spring is secured to the main body, and an opposite end of the second torsion spring is secured to the gear, when the switch is moved to the second position, the rack pushes the pulling rod away from the at least one card holder.

4. The electronic device as described in claim 3, wherein the pulling rod comprises a first rod and at least one second rod with an end substantially perpendicular to and secured to the first rod, the switch and the at least one second rod are arranged at the same side of the first rod, an opposite end of each of the at least one second rod is connected to one of the at least one latching member.

5. The electronic device as described in claim 4, wherein the card holder control mechanism further comprises at least one sleeve, at least one stopper block, and at least one elastic member, each of the at least one stopper block is secured within one of the at least one sleeve, each of the at least one stopper block and each of the at least one elastic member are arranged over one of the at least one second rod, opposite ends of each of the at least one elastic member respectively resist one of the at least one latching member and one of the at least one stopper block, when the pulling rod is moved away from the at least one card holder, the at least one elastic member is compressed, when the at least one elastic member rebounds, the pulling rod and the at least one latching member are driven to return to their original state.

6. The electronic device as described in claim 1, wherein the main body defines at least one compartment to receive the at least one card holder, each of the at least one compartment comprises a first opening defined in a sidewall of the main body and a second opening communicating with the first opening, the at least one latching member latches the at least one card holder to the main body through the at least one second opening, the at least one card holder is driven out of the main body through the at least one first opening.

7. The electronic device as described in claim 6, wherein the at least one card holder, the at least one compartment, and the at least one second opening are substantially sector-shaped.

8. The electronic device as described in claim 7, wherein each of the at least one card holder comprises a sector-shaped sidewall, each of the at least one sector-shaped sidewall defines a recessed portion, the at least one latching member engages the at least one recessed portion to latch the at least one card holder to the main body.

9. The electronic device as described in claim 7, wherein each of the at least one card holder comprises a sector-shaped sidewall, an end of each of the at least one card holder away from the sector-shaped sidewall is rotatably fixed in place on the shaft.

10. The electronic device as described in claim 1, wherein the at least one first torsion spring comprises two first torsion springs, the at least one card holder comprises two card holders, the at least one latching member comprises two latching members, the card holders are respectively rotatably fixed on opposite ends of the shaft and arranged at the same side of the shaft, opposite ends of one of the first torsion springs are respectively secured to the shaft and one of the card holders, opposite ends of the other one of the first torsion springs are respectively secured to the shaft and the other one of the card holders, the pulling rod comprises a first rod and two second rods substantially perpendicular to the first rod and arranged at the same side of the first rod, the latching members are respectively connected to the second ends, the latching members respectively engage the card holders to latch the card holders to the main body.

* * * * *